US012618374B2

(12) United States Patent
Ryon et al.

(10) Patent No.: US 12,618,374 B2
(45) Date of Patent: May 5, 2026

(54) SWIRL VALVES

(71) Applicant: Collins Engine Nozzles, Inc., Des Moines, IA (US)

(72) Inventors: Jason A. Ryon, Carlisle, IA (US); Philip E. O. Buelow, West Des Moines, IA (US); Andy W. Tibbs, Earlham, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 173 days.

(21) Appl. No.: 18/370,502

(22) Filed: Sep. 20, 2023

(65) Prior Publication Data

US 2025/0092831 A1      Mar. 20, 2025

(51) Int. Cl.
  *F02C 7/232*      (2006.01)
  *F16K 31/04*      (2006.01)
  *F23R 3/28*      (2006.01)
(52) U.S. Cl.
  CPC .............. *F02C 7/232* (2013.01); *F16K 31/04* (2013.01); *F23R 3/28* (2013.01)
(58) Field of Classification Search
  CPC ........ F02C 7/232; F15D 1/0015; F16K 31/04; F23R 3/28
  See application file for complete search history.

(56) References Cited

U.S. PATENT DOCUMENTS

| | | | | |
|---|---|---|---|---|
| 3,324,891 | A | * | 6/1967 | Rhoades ................... F15C 1/16 |
| | | | | 123/511 |
| 3,521,657 | A | * | 7/1970 | Ayers ........................ F15C 1/16 |
| | | | | 137/813 |
| 3,566,900 | A | * | 3/1971 | Black ...................... F15C 1/002 |
| | | | | 137/83 |
| 3,638,672 | A | | 2/1972 | Smith et al. |
| 3,776,460 | A | * | 12/1973 | Fichter .................. B05B 1/3426 |
| | | | | 239/474 |
| 3,899,925 | A | | 8/1975 | Hausfeld |
| 4,192,466 | A | | 3/1980 | Tanasawa et al. |
| 4,259,840 | A | * | 4/1981 | Tenney ................... F02B 37/18 |
| | | | | 60/602 |
| 4,817,863 | A | * | 4/1989 | Bragg ..................... F24F 13/08 |
| | | | | 236/80 D |
| 5,165,374 | A | | 11/1992 | Chapman et al. |

(Continued)

FOREIGN PATENT DOCUMENTS

| | | |
|---|---|---|
| WO | 2008138347 A1 | 11/2008 |
| WO | 2013109272 A1 | 7/2013 |

OTHER PUBLICATIONS

Extended European Search Report for European Patent Application No. 24201551.9, dated Feb. 18, 2025, 8 pages.

*Primary Examiner* — Jesse S Bogue
(74) *Attorney, Agent, or Firm* — Kinney & Lange, P.A.

(57)      ABSTRACT

A valve system includes a spin chamber having an outlet drain configured to allow flow out of the spin chamber. A main spin surface of the spin chamber is defined around the outlet drain. A directional jet system is in fluid communication with the spin chamber. The directional jet system includes a member that is configured to move between a first position for directing a tangential flow around the drain, and a second position for directing a radial flow toward the drain.

19 Claims, 5 Drawing Sheets

(56)                References Cited

U.S. PATENT DOCUMENTS

| | | | |
|---|---|---|---|
| 6,474,569 B1 * | 11/2002 | Brundish | F23C 7/008 |
| | | | 60/39.23 |
| 7,191,961 B2 * | 3/2007 | Okamoto | F02M 61/1853 |
| | | | 239/533.1 |
| 9,068,660 B2 | 6/2015 | Mayr et al. | |
| 9,291,032 B2 * | 3/2016 | Greci | E21B 43/12 |
| 9,291,139 B2 | 3/2016 | Hicks et al. | |
| 9,375,739 B2 * | 6/2016 | Ivri | A45D 34/00 |
| 9,719,365 B2 * | 8/2017 | Bacic | F01D 11/24 |
| 10,422,258 B2 * | 9/2019 | Gopalan | G05D 7/0186 |
| 10,598,058 B2 | 3/2020 | Gopalan et al. | |
| 10,662,914 B2 | 5/2020 | Nagaoka et al. | |
| 10,807,108 B2 | 10/2020 | Tibbs et al. | |
| 10,974,259 B2 * | 4/2021 | Rong | B05B 1/1627 |
| 11,053,862 B2 | 7/2021 | Ryon et al. | |
| 11,326,775 B2 | 5/2022 | Kramer | |
| 2009/0226301 A1 * | 9/2009 | Priestman | F15C 1/02 |
| | | | 137/810 |
| 2015/0354824 A1 | 12/2015 | Kramer | |
| 2019/0283048 A1 * | 9/2019 | Rong | B05B 1/1636 |
| 2025/0198344 A1 * | 6/2025 | Williams | F15D 1/0015 |

* cited by examiner

SWIRL VALVES

BACKGROUND

1. Field

The present disclosure relates to flow control, and more particularly to flow control such as for controlling flow of fuel in aircraft fuel injection and the like.

2. Description of Related Art

Certain valves require only adjustment of the flow over a given range and not complete control, e.g. they do not have to completely close off flow. Some valves have springs with a balanced pressure force to control the open area of the valve. Some valves have integral check valves. Certain valves can be electronically controlled through a solenoid, stepper motor, or the like.

Spool valves are currently used in fuel injectors for gas turbine engines to control the flow to a circuit for a given inlet pressure. They can be costly to make because of multiple factors such as the following. They are often made using a carefully toleranced port opening to allow a certain amount of flow for a given pressure. The spool valve is typically match ground with the sleeve to reduce the amount of leakage which bypasses the metering port. On the other hand, electronic solenoid type valves typically need large power forces to overcome flow pressure to adjust the spool window.

The conventional techniques have been considered satisfactory for their intended purpose. However, there is an ever present need for improved systems and methods for reliable and cost effective valving, such as for valves used in fuel injectors for gas turbine engines and the like. This disclosure provides a solution for this need.

SUMMARY

A valve system includes a spin chamber having an outlet drain configured to allow flow out of the spin chamber. A main spin surface of the spin chamber is defined around the outlet drain. A directional jet system is in fluid communication with the spin chamber. The directional jet system includes a member that is configured to move between a first position for directing a tangential flow around the drain, and a second position for directing a radial flow toward the drain.

The directional jet system can include a jet orifice that feeds into the spin chamber. The spin chamber may include only one inlet, namely the jet orifice. The spin chamber may include only one outlet, namely the outlet drain.

The jet member can include a jet tube. The jet orifice can be defined at an outlet end of the jet tube. The directional jet system can be configured to rotate the jet tube to direct the jet orifice more toward a periphery of the spin chamber in the first position relative to the second position. The directional jet system can be configured to rotate the jet tube to direct the jet orifice more toward the drain outlet in the second position relative to the first position. The directional jet system can include one or more inlets configured to feed into the jet tube configured to supply fluid to the jet orifice. The directional jet system can include a rotational actuator operatively connected to rotate the jet tube between the first position and the second position. The directional jet system can include a housing with a main inlet in fluid communication with an interior of the housing. The jet tube can include at least one inlet inside the housing in fluid communication to receive flow from the interior of the housing into the jet tube. The rotational actuator can be inside the housing. The rotational actuator can be operatively connected to rotate the jet tube between the first position and the second position around a rotation axis parallel to an axis defined by the drain outlet. The main spin surface can be planar. The main spin surface can be conical, converging towards the drain outlet.

The directional jet system can include a housing with a main inlet in fluid communication with an interior of the housing. The jet tube can include at least one inlet inside the housing in fluid communication to receive flow from the interior of the housing into the jet tube. The rotation actuator can be outside of the housing with a shaft extending into housing operatively connected to rotate jet tube inside housing. The main inlet can extend along or parallel to an axis defined by the drain outlet. The rotational actuator can be operatively connected to rotate the jet tube between the first position and the second position around a rotation axis oblique to the axis defined by the drain outlet. The main inlet can extend lateral to an axis defined by the drain outlet. The rotational actuator can be operatively connected to rotate the jet tube between the first position and the second position around a rotation axis oblique to the axis defined by the drain outlet.

The directional jet system can include a seal operatively connected to the spin chamber to seal the jet orifice in a third position of the directional jet system to stop flow into the spin chamber from the directional jet system. The directional jet system can include a check valve operatively connected to the spin chamber to check the jet orifice in a third position of the directional jet system to stop flow into the spin chamber from the directional jet system below a predetermined pressure.

The drain outlet can feed into a hydromechanical piston valve assembly. The drain outlet can feed into the hydromechanical piston valve assembly in series with a main flow passage through the hydromechanical piston valve assembly. The drain outlet can feed into the hydromechanical piston valve assembly in a side stream that is parallel with a main flow passage through the hydromechanical piston valve assembly.

The jet orifice can be fixed relative to the spin chamber. The jet member can include a diverter downstream from the jet orifice. The diverter can be configured to move to divert flow from the jet orifice between the first position and the second position.

A feed arm can be connected in fluid communication with the drain outlet. A spray nozzle can be connected in fluid communication with the feed arm downstream of the drain outlet for issuing a spray.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
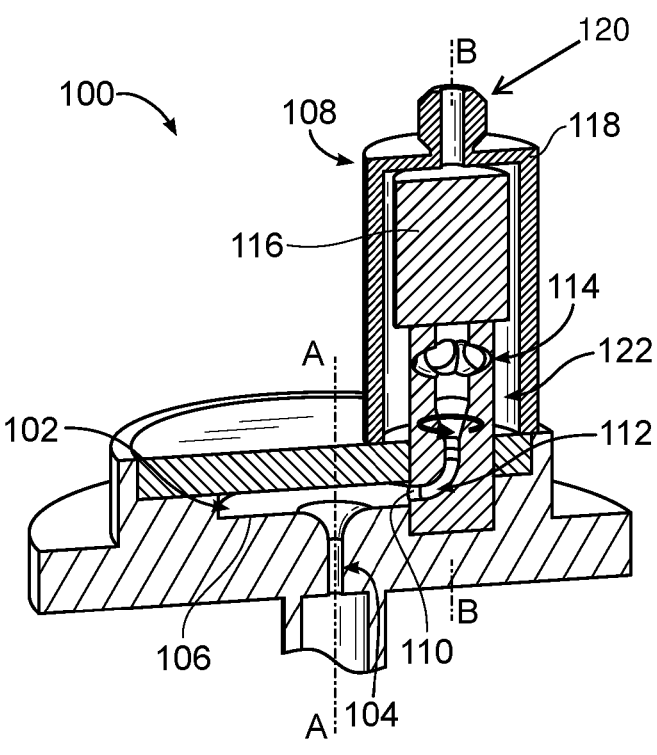
FIG. 1 is a schematic cross-sectional perspective view of an embodiment of a valve system constructed in accordance with the present disclosure, showing the directional jet system and the spin chamber.

Reference will now be made to the drawings wherein like reference numerals identify similar structural features or aspects of the subject disclosure. For purposes of explanation and illustration, and not limitation, a partial view of an embodiment of a valve system in accordance with the disclosure is shown in FIG. 1 and is designated generally by reference character 100. Other embodiments of systems in accordance with the disclosure, or aspects thereof, are provided in FIGS. 2-11, as will be described. The systems and methods described herein can be used to control flow through a valve system using a directional jet and spin chamber, wherein changing direction of the jet relative to the spin chamber allows for increasing or decreasing flow through the valve system.

The valve system 100 includes a spin chamber 102 having an outlet drain 104 configured to allow flow out of the spin chamber 102. A main spin surface 106 of the spin chamber is defined around the outlet drain 104, i.e. around an axis A defined through the outlet drain 104. A directional jet system 108 is in fluid communication with the spin chamber 102. The directional jet system 108 includes a member that is configured to move between a first position for directing a tangential flow around the drain, e.g. as indicated by the flow arrow in FIG. 6, and a second position for directing a radial flow toward the drain, as indicated by the flow arrow in FIG. 7. Directing the flow in the tangential direction indicated in FIG. 6 reduces flow through the valve system 100 relative to directing flow in the radial direction of FIGS. 1 and 7, so rotation of the directional jet ultimately controls how much flow can go through the valve system 100. Intermediate positions between the tangential and radial positions allow for intermediate flow volumes.

With continued reference to FIG. 1, the directional jet system 108 includes a jet orifice 110 that feeds into the spin chamber 102. The spin chamber 102 need only include one inlet, namely the jet orifice 110, and one outlet, namely the outlet drain 104. The jet member includes a jet tube 112. The jet orifice 110 is defined at an outlet end of the jet tube 112. The directional jet system 108 is configured to rotate the jet tube 112 about rotation axis B to direct the jet orifice 110 more toward a periphery of the spin chamber in the first position relative to the second position, for lower flow, highly swirling tangential flow in the spin chamber. The directional jet system 108 is configured to rotate the jet tube 112 about the rotation axis B to direct the jet orifice 110 more toward the drain outlet 104 in the second position relative to the first position for higher flow, relatively swirl free flow in the spin chamber. The directional jet system 108 includes one or more inlets, e.g. tangential inlets 114 configured to feed into the jet tube 112 to supply fluid to the jet orifice 110.

With continued reference to FIG. 1, the directional jet system 108 includes a rotational actuator 116 operatively connected to rotate the jet tube 112 back and forth between the first and second positions, i.e. about the rotation axis B. The actuator 116 can be a two way rotary solenoid or stepper motor, or the like, and/or can include a return bias member such as a spring so the actuator is biased toward one extreme position when not energized. Reference is made to to U.S. Pat. No. 9,617,919 (which is incorporated by reference herein in its entirety) for possible examples of low energy multi-position solenoids. Note that the position of the jet tube 112 can cover not only full-on/off operation but can be positioned proportionally anywhere between the positions of FIGS. 5 and 7 for example, and the rotary actuator can cover operation all the way from either a fixed position 1 to position 2, but also varying the position between two positions gradually. Stepper motors can be used which could have very fine increments (e.g. 5° control) which would give good proportionality.

The directional jet system 108 includes a housing 118 with a main inlet 120 in fluid communication with an interior 122 of the housing 118. The jet tube 112 includes at least one inlet 114 inside the housing 118 in fluid communication to receive flow from the interior 122 of the housing 118 into the jet tube 112. The rotational actuator 116 is inside the housing 118, and is operatively connected to rotate the jet tube 112 between the first and second positions around a rotation axis B that is parallel to the axis A defined by the drain outlet 104, and the main inlet 120 extends parallel with or along the axis B, and parallel with the axis A. The main spin surface is planar 106, however it is also contemplated that the main spin surface 106 can be conical, as shown in FIGS. 2-3, converging towards the drain outlet 104, e.g. to reduce flow angle into the drain outlet 104 and reduce pressure loss.

Figure 2:
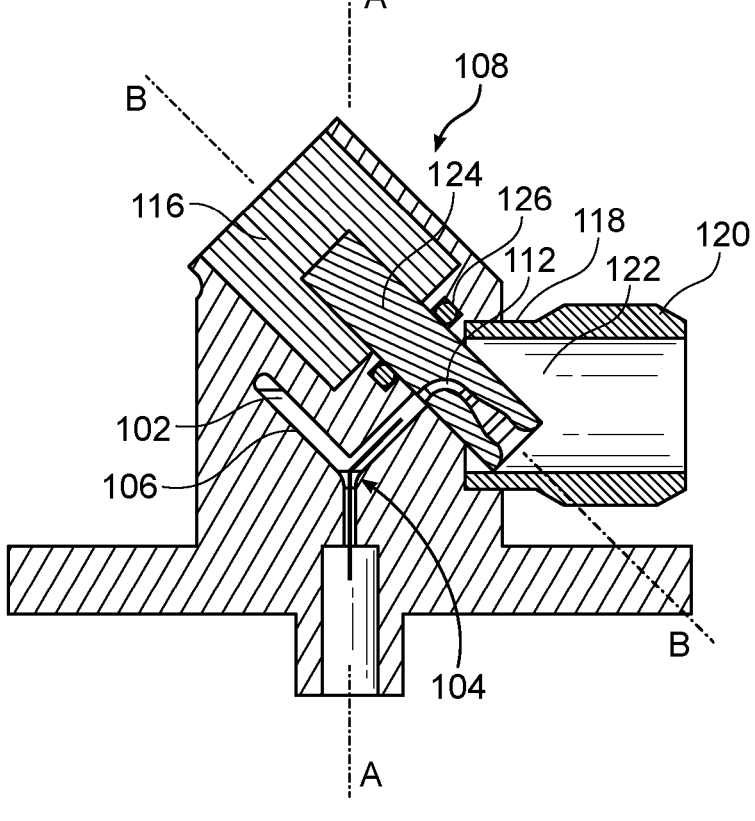
FIG. 2 is a cross-sectional side elevation view of an embodiment of the valve system of FIG. 1, showing a conical spin chamber.
Figure 3:
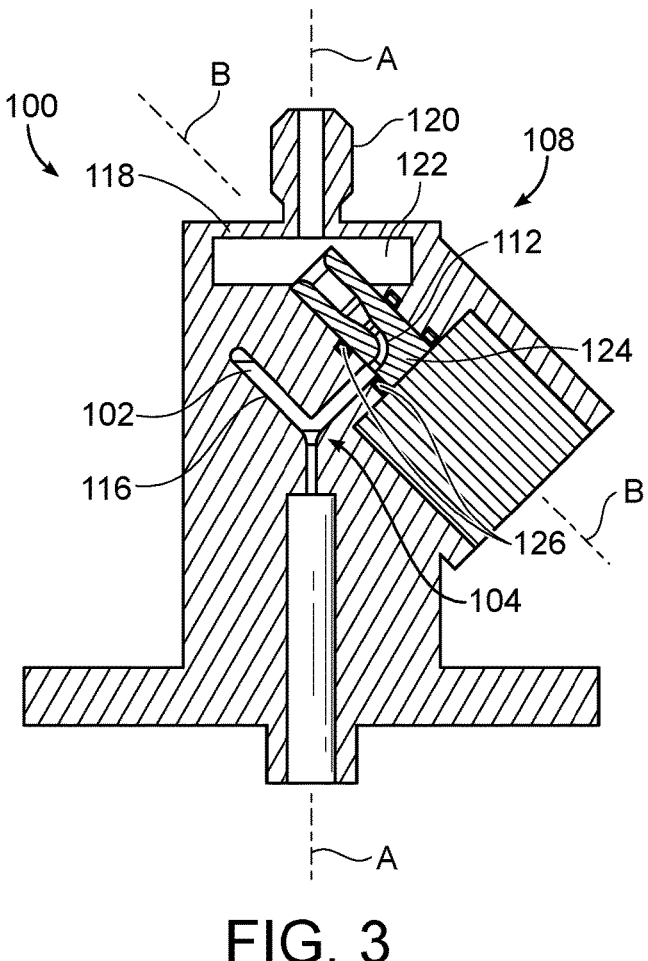
FIG. 3 is a cross-sectional side elevation view of an embodiment of the valve system of FIG. 2, showing a different packaging of valve actuator.

With continued reference to FIGS. 2-3, the rotation actuator 116 can be outside of the housing 118 with a shaft 124 extending into housing 118 operatively connected to rotate jet tube 112 inside housing. As shown in FIG. 2, the main inlet 120 can extend lateral to the axis A and to the axis B, wherein the rotational actuator 116 is operatively connected to rotate the jet tube 112 between the first and second positions around a rotation axis B that is oblique to the axis A. In FIG. 3, the main inlet 120 extends along or parallel to the axis A defined by the drain outlet 104, although the rotational actuator 116 is operatively connected to rotate the jet tube 112 between the first and second positions around a rotation axis B that is oblique to the axis A. Seals such as o-rings 126 can be used to prevent leaking round the porting for the jet tube 112.

Figure 4:
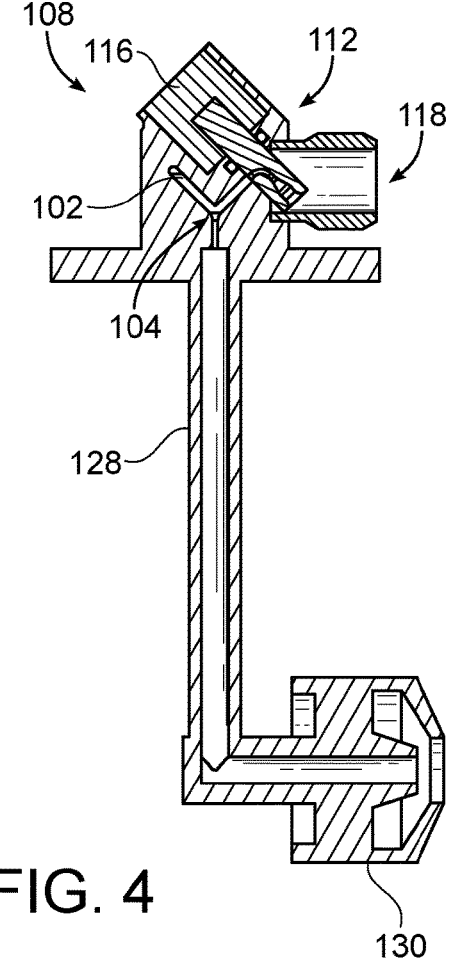
FIG. 4 is a cross-sectional side elevation view of the valve system of FIG. 2, showing the feed arm and spray nozzle.

With reference to FIG. 4, a feed arm 128 can be connected in fluid communication with the drain outlet 104. A spray nozzle 130 can be connected in fluid communication with the feed arm 128 downstream of the drain outlet 104 for issuing a spray, such as for fuel injection in a gas turbine engine or the like. The feed arm 128 and spray nozzle 130 are shown for the configuration of the valve system 100 as shown in FIG. 2, however those skilled in the art will readily appreciate that the feed arm 128 and spay nozzle 130 can be included in any of the configurations disclosed herein.

Figures 5, 6, 7:
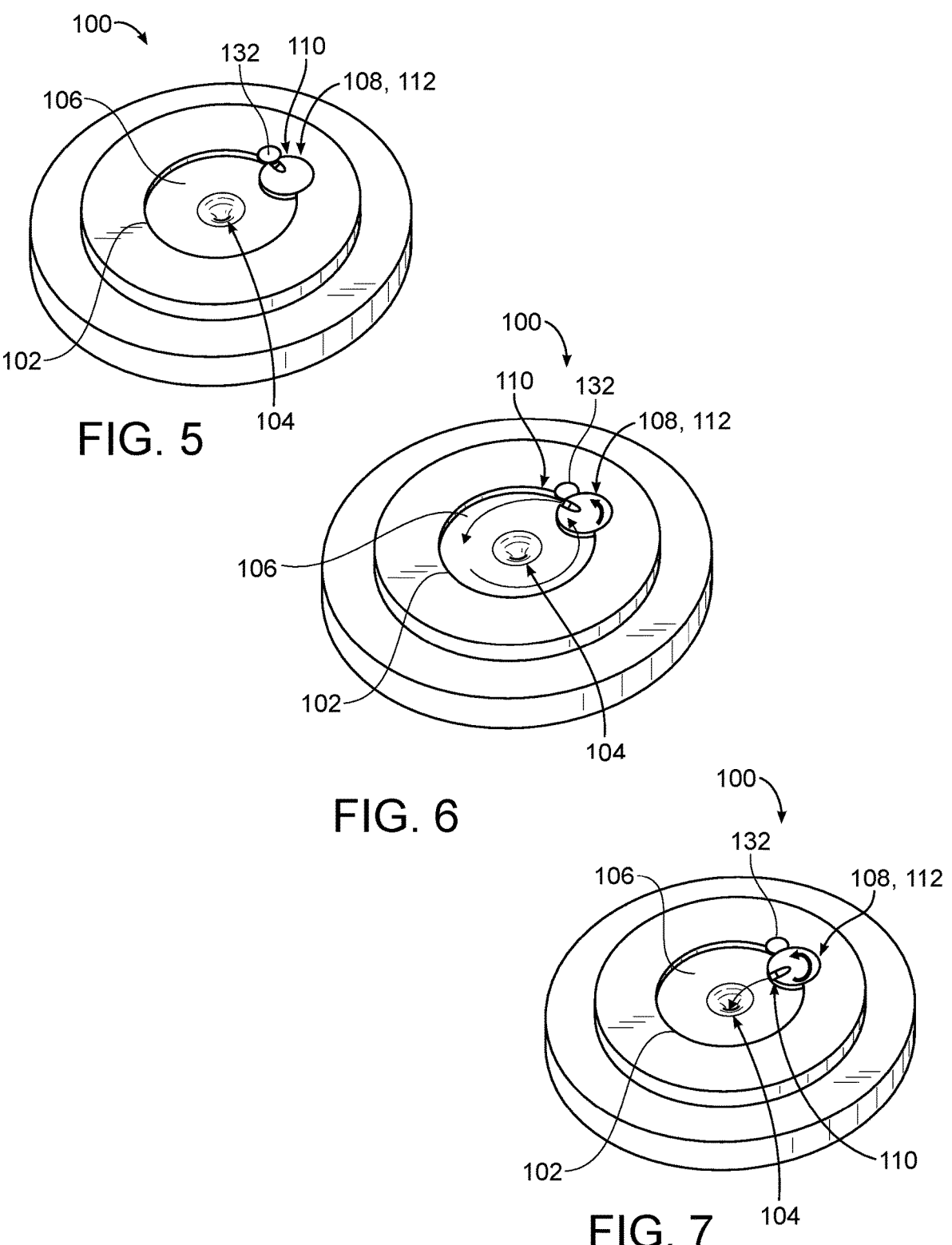
FIGS. 5-7 are schematic perspective views of an embodiment of the system of FIG. 1, showing three respective positions of the jet tube.

With reference now to FIGS. 5-7, the directional jet system 106 can include a seal 132 operatively connected to the spin chamber 102 to seal the jet orifice 110 in a third position of the directional jet system 108 to stop flow into the spin chamber 102 from the directional jet system 108, as shown in FIG. 5, where FIGS. 6-7 show the first and second positions described above, with corresponding tangential and radial flow arrows, respectively. In addition to or in lieu of a seal 132, the item 132 can be a check valve operatively connected to the spin chamber 102 to check the jet orifice 110 in the third position of the directional jet system 108 to stop flow into the spin chamber 102 from the directional jet system 108 below a predetermined inlet pressure. The check valve configuration may not require elastomeric seal. Incorporating a completely closed check valve when jet is rotated past spin chamber wall allows valve to open as a port window until the jet is fully exposed, then with continued rotation toward the radial direction, the system can behave like a swirl valve. It is also contemplated that the seal 132 can be omitted and the jet orifice 110 can simply seal against the wall of the spin chamber 102 in the third position shown in FIG. 5.

Figures 8, 9:
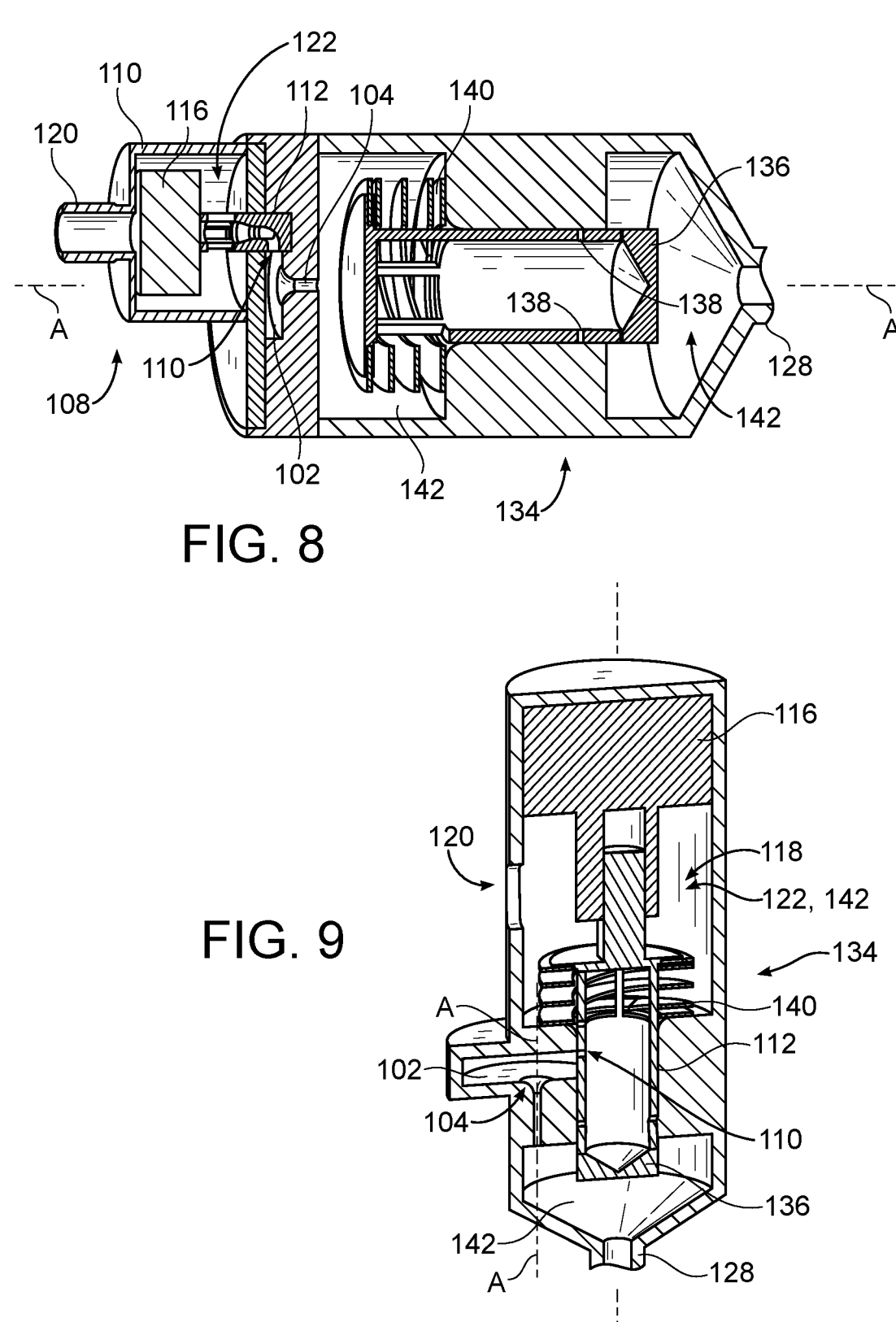
FIGS. 8-9 are cross-sectional schematic perspective views of embodiments of the system of FIG. 1, showing the directional jet system in series and in parallel with a hydromechanical valve assembly, respectively.

With referenced now to FIGS. 8-9, the drain outlet 104 can feed into a hydromechanical piston valve assembly 134 that includes a piston 136 with ports 138 and a biasing member 140 configured to bias the member against pressure flowing through the assembly 134. When pressure on flow through the assembly 134 acts on the piston 136, the piston 136 can slide linearly along its axis against the bias of the biasing member 140. In FIG. 8, the drain outlet 104 feeds into the hydromechanical piston valve assembly 134 in series with a main flow passage 142 through the hydromechanical piston valve assembly 134, e.g. upstream of the piston 136. In FIG. 9, the drain outlet 104 feeds into the hydromechanical piston valve assembly 134 in a side stream that is parallel with a main flow passage 142 through the hydromechanical piston valve assembly 134. In this case, the actuator 116 rotates the piston 136, which doubles as the jet tube 112. The rotational direction of the outlet orifice 110 controls how much flow can pass through the side stream that includes the drain outlet 104. The piston 136 is keyed to the shaft 124 of the actuator 116 for rotation by the actuator 116, but the piston 136 is free to slide along its axis relative to the shaft 124 of the actuator 116.

Figure 10:
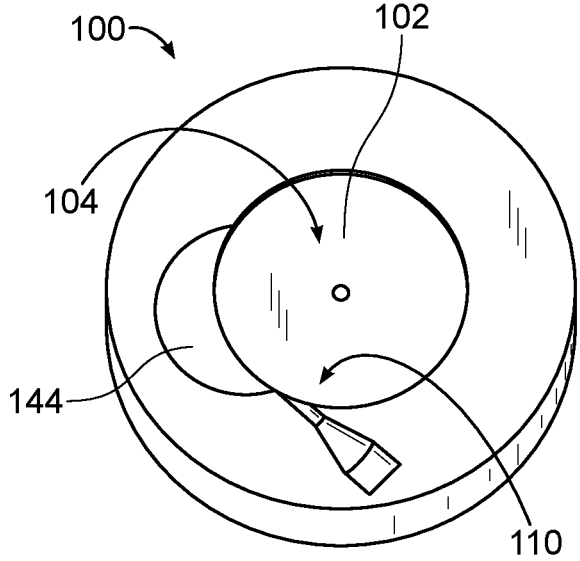
FIGS. 10-11 are schematic perspective views of an embodiment of the system of FIG. 1, showing a diverter for a fixed jet orifice, showing the diverter in the first and second positions, respectively.
Figure 11:
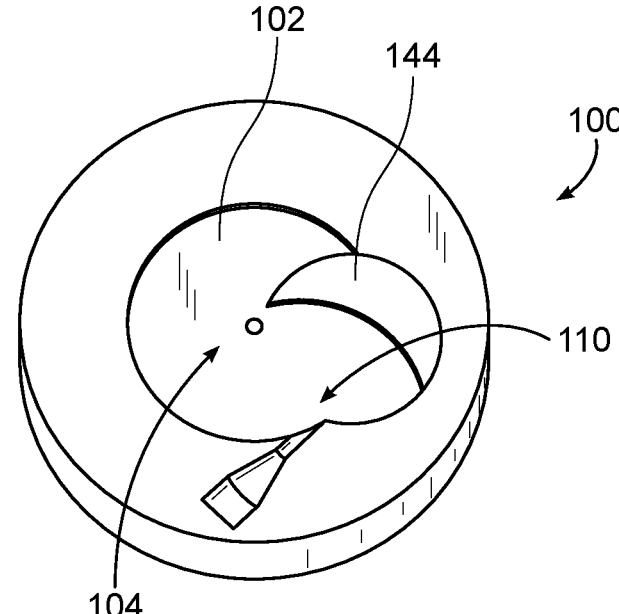

With reference now to FIGS. 10-11, the jet orifice 110 can be fixed relative to the spin chamber 102. The jet member includes a diverter 144 downstream from the jet orifice 110. The diverter 144 is configured to move to divert flow from the jet orifice 110 between the first position shown in FIG. 10 for tangential flow, e.g. where the downstream end of the diverter 144 points tangentially around the drain outlet 104, and the second position shown in FIG. 11 for radial flow, e.g. where the downstream end of the diverter 144 points to more directly to the drain outlet 104.

Systems and methods as disclosed herein provide potential benefits including the following. They do not require match grinding to match a piston and a sleeve. They do not need highly calibrated valve porting (the flow profile can be set electronically). They can be used to trim high power or low power. They do not require large forces to hold position—there is no pressure balance except a relatively small thrust from a jet and force to overcome a spring return if included. They can be designed to fail in place, or closed, or open, depending on spring return chosen. They can adjust 30% or more of flow through adjusting the amount of swirl in the swirl chamber. The amount of adjustable flow depends on the size of the jet and amount of offset of the spin chamber e.g. as shown in FIGS. 8-9. They can be turned completely closed (e.g. with or without a check valve) and can have window opening. They can be integrated with existing hydromechanical valves to incorporate full scheduling.

The methods and systems of the present disclosure, as described above and shown in the drawings, provide for controlling flow through a valve system using a directional jet and spin chamber, wherein changing direction of the jet relative to the spin chamber allows for increasing or decreasing flow through the valve system. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve system comprising:
   a spin chamber having an outlet drain configured to allow flow out of the spin chamber, wherein a main spin surface of the spin chamber is defined around the outlet drain; and
   a directional jet system for a fuel in fluid communication with the spin chamber, wherein the directional jet system includes a jet member that is configured to move between a first position for directing a tangential flow around the drain, and a second position for directing a radial flow toward the drain;
   wherein the member is disposed at a periphery of the spin chamber and wherein a portion of the member directing the flow extends closer to the outlet drain with the member in the second position than with the member in the first position.

2. The system as recited in claim 1, wherein the directional jet system includes a jet orifice that feeds into the spin chamber, wherein the spin chamber includes only one inlet, namely the jet orifice, and wherein the spin chamber includes only one outlet, namely the outlet drain.

3. A valve system comprising:
   a spin chamber having an outlet drain configured to allow flow out of the spin chamber, wherein a main spin surface of the spin chamber is defined around the outlet drain; and
   a directional jet system for a fuel in fluid communication with the spin chamber, wherein the directional jet system includes a jet member that is configured to move between a first position for directing a tangential flow around the drain, and a second position for directing a radial flow toward the drain;
   wherein the jet member includes a jet tube, wherein a jet orifice is defined at an outlet end of the jet tube, wherein the directional jet system is configured to rotate the jet tube to direct the jet orifice more toward a periphery of the spin chamber in the first position relative to the second position, and wherein the directional jet system is configured to rotate the jet tube to direct the jet orifice more toward the drain outlet in the second position relative to the first position.

4. The system as recited in claim 3, wherein the directional jet system includes one or more inlets configured to feed into the jet tube configured to supply fluid to the jet orifice.

5. The system as recited in claim 3, wherein the directional jet system includes a rotational actuator operatively connected to rotate the jet tube between the first position and the second position.

6. The system as recited in claim 5, wherein the directional jet system includes a housing with a main inlet in fluid communication with an interior of the housing, wherein the jet tube includes at least one inlet inside the housing in fluid communication to receive flow from the interior of the housing into the jet tube.

7. The system as recited in claim 6, wherein the rotational actuator is inside the housing.

8. The system as recited in claim 6, wherein the rotational actuator is operatively connected to rotate the jet tube between the first position and the second position around a rotation axis parallel to an axis defined by the drain outlet.

9. The system as recited in claim 5, wherein the main spin surface is planar.

10. The system as recited in claim 5, wherein the main spin surface is conical, converging towards the drain outlet.

11. The system as recited in claim 5, wherein the directional jet system includes a housing with a main inlet in fluid communication with an interior of the housing, wherein the jet tube includes at least one inlet inside the housing in fluid communication to receive flow from the interior of the housing into the jet tube, wherein the rotation actuator is outside of the housing with a shaft extending into housing operatively connected to rotate jet tube inside housing.

12. The system as recited in claim 11, wherein the main inlet extends along or parallel to an axis defined by the drain outlet, wherein the rotational actuator is operatively connected to rotate the jet tube between the first position and the second position around a rotation axis oblique to the axis defined by the drain outlet.

13. The system as recited in claim 11, wherein the main inlet extends lateral to an axis defined by the drain outlet, wherein the rotational actuator is operatively connected to rotate the jet tube between the first position and the second position around a rotation axis oblique to the axis defined by the drain outlet.

14. The system as recited in claim 3, wherein the directional jet system includes a seal operatively connected to the spin chamber to seal the jet orifice in a third position of the directional jet system to stop flow into the spin chamber from the directional jet system.

15. The system as recited in claim 3, wherein the directional jet system includes a check valve operatively connected to the spin chamber to check the jet orifice in a third position of the directional jet system to stop flow into the spin chamber from the directional jet system below a predetermined pressure.

16. The system as recited in claim 2, wherein the drain outlet feeds into a hydromechanical piston valve assembly.

17. The system as recited in claim 16, wherein the drain outlet feeds into the hydromechanical piston valve assembly in series with a main flow passage through the hydromechanical piston valve assembly.

18. The system as recited in claim 1, further comprising:
a feed arm connected in fluid communication with the drain outlet; and
a spray nozzle connected in fluid communication with the feed arm downstream of the drain outlet for issuing a spray.

19. A valve system comprising:
a spin chamber having an outlet drain configured to allow flow out of the spin chamber, wherein a main spin surface of the spin chamber is defined around the outlet drain, wherein the spin chamber is circular; and
a directional jet system for a fuel in fluid communication with the spin chamber, wherein the directional jet system includes a member that is configured to move between a first position for directing a tangential flow around the drain, and a second position for directing a radial flow toward the drain;
wherein the member is at least partially within and at a periphery of the spin chamber.

* * * * *